Patented Feb. 17, 1942

2,273,521

UNITED STATES PATENT OFFICE 2,273,521

TREATMENT OF PECTINOUS MATERIALS

Paul Hirsch, Palermo, Italy, assignor, by mesne assignments, to California Fruit Growers Exchange, Los Angeles, Calif., a corporation of California No Drawing. Application November 21, 1935, Serial No. 50,871. In Germany November 26, 1934

2 Claims. (Cl. 260—210)

This invention relates to a process for the production of pectin.

An object of this invention is the conversion of the water-insoluble pectin, contained in vegetable starting materials and in intermediate products obtained therefrom and, for example, already enriched in pectin, into water-soluble pectin.

A further object of this invention is the separation of the water-soluble pectin, obtained by conversion from water-insoluble pectin, and/or the pectin already contained in water-soluble form in vegetable starting materials or in intermediate products obtained therefrom, and for example, enriched in pectin, from other vegetable constituents, as well as the recovery of water-soluble pectin in a pure, dissolved or solid form, from vegetable raw materials and from intermediate products obtained therefrom.

The chief property of pectin essential for its practical utilisation is, as is known, its gelatinising power. This, as well as the other properties of pectin, depend to a considerable extent on the method of its recovery from the starting materials.

As is known, the pectin contained in the vegetable materials is to a large extent present in a water-insoluble form known as "protopectin," it being assumed that the actual pectin molecule in the protopectin is combined with other substances of high molecular weight.

It is known to recover the pectin, contained in the vegetable materials, in a water-soluble form by treating the vegetable materials with hot water or a hot aqueous acid solution, the separation of the actual water-soluble pectin molecule from the aforesaid accompanying substances being probably effected by hydrolysis. These known processes however have the disadvantage that the pectin is considerably damaged by the action of the hot aqueous liquids on "boiling out" the pectin and in particular that its gelatinising properties are impaired thereby.

Moreover, the insoluble constituents present in the starting material are converted by this treatment into a condition extremely unfavourable for the further working up of the product, in that they swell up and acquire a mucilaginous consistency, whereby their separation from the aqueous extract by filtration is rendered very difficult. In order to obtain filtrable products and yields which are in some degree satisfactory very large quantities of liquids must be employed in the known processes, as a result of which correspondingly large apparatus must be employed and considerable costs be incurred for the evaporation of the resulting pectin extracts in costly vacuum evaporators constructed from expensive acid-resisting materials, such as chromium steel.

According to this invention these and other disadvantages of the known processes are overcome by treating the vegetable starting materials, containing the pectin entirely or partially in an insoluble form, with an organic solvent in which the substances accompanying the pectin are soluble but in which pectin itself is practically insoluble, in the presence of an acid, whereby the molecular complex, containing the pectin in a water-insoluble form, is broken down and the pectin present therein is converted into the water-soluble form and the accompanying substances are simultaneously brought into solution. The residue, containing the entire pectin in a water-soluble form, can then be separated from the solution of the accompanying substances by filtration or in other suitable manner. Preferably however the aforementioned breaking down treatment is followed by an extraction of the residue with a solvent, in which the substances accompanying the pectin are soluble.

The broken down residue, if desired after being further treated in the aforementioned manner, may be employed directly as gelatinising agent for many purposes of application, for which the production of clear solutions is not essential. Alternatively, however, the pectin contained therein may be recovered in the form of a pure solution by extraction with water and separation of the resulting solution from the water-insoluble constituents. The pectin may thereafter be recovered in dry form from the solution by processes known per se, for example by evaporation in vacuo.

As starting materials there may be employed according to this invention any desired pectin-containing materials or intermediate products. Mention may be made by way of example of apple residues, orange peel, lemons, grapefruit and the like, orange pith (i. e. the inner white layer of orange skins), residues from the manufacture of lemon juice (for example the bisected and expressed fruits known in Italy as "Pastazzo"), extracted scraps from the manufacture of beet sugar and the like.

The starting materials may be employed both in a fresh and still moist condition and also in a dry condition. Previous drying is to be recommended in many cases, for example when employing apple residues, because the weight and volume of the starting material and the quantity of solvent required for the treatment thereof, as well as the space required for the treatment apparatus, are considerably reduced thereby and the pectin yield is increased.

Drying of the starting material is preferably effected in vacuo at relatively low or moderate temperature for example at about 50° C.

If the starting material is not to be immediately subjected to the process of this invention, it is in general advisable to inhibit the detrimental action of the enzymes and micro-organisms contained therein by a treatment known per se.

The most varied kinds of materials, which are adapted to bring the accompanying substances of the pectin partially or entirely into solution but practically do not dissolve or only to an inappreciable extent dissolve the pectin itself, such as alcohols, particularly aliphatic alcohols, for example ethyl, methyl, propyl and isopropyl alcohols, acetone, methyl-ethyl ketone, ethyl acetate and the like, may be used as organic treating agents.

These aforesaid materials may, for example, be employed in an anhydrous condition. When employing solvents miscible with water, these may also be employed in conjunction with certain, preferably only slight, quantities of water, the water content not being so great that appreciable quantities of pectin can be brought into solution. When employing ethyl alcohol the water content should, for example, amount to at most about 30–40%, preferably to at most 20 to 30%.

Such organic solvents are in general to be preferred for economic reasons as can be readily recovered (for example by distillation).

As acids, both mineral acids and also organic acids of the most varied kinds have proved to be suitable, for example mineral acids, such as hydrochloric acid and sulphuric acid, or organic acids, such as acetic acid. When employing organic acids, such as glacial acetic acid, these may, if desired, simultaneously serve as solvents for the accompanying substances of the pectin, so that the simultaneous use of other solvents can be entirely or partially dispensed with in such cases.

Two or more different solvents and/or two or more different acids may be simultaneously employed.

When employing the starting materials in a moist condition, a correspondingly larger quantity of the solvent for the accompanying substances of the pectin, which may, for example, be miscible with water, such as methyl or ethyl alcohol may in general be employed, so as to ensure that the final concentration of the organic solvent in the treatment liquid is sufficiently great to prevent appreciable quantities of pectin going into solution by the action of the water present.

Although the quantity of the acid employed or its concentration in the treatment liquid may vary within fairly wide limits, it is preferred not to overstep certain concentrations both downwards and upwards, since the use of too little acid impairs the yield of pectin and hinders the removal of the accompanying substances from the starting material, and, on the other hand, when employing too large quantities of acid, the pectin may become damaged. Since the other working conditions, for example temperature and time of treatment, may have an influence on the question of the most favourable quantities of acid to be employed in any individual case, it is best each time to ascertain the most favourable quantity of acid by a simple prior test. This is advisable because a quantity of acid, which differs according to its nature and the nature of the starting material and which in itself takes no part in the breaking down process, is fixed by the starting material, particularly when using mineral acids. In general it is advisable, when using mineral acids, to use such quantities that, after the breaking down treatment, the concentration of free acid in the remaining liquid is at most 0.1 normal, preferably only at most about 0.07 normal. Excellent results may however also be obtained with higher acid concentrations and also with treatment liquids, which after the breaking down process, for example, no longer contain any excess of free acid.

Organic acids may in general be employed according to this invention in considerable concentrations, without harm to the finished products. Thus glacial acetic acid has, for example, been found to be an admirable treating agent.

The temperature and duration of the breaking down treatment have also to be adapted in each individual case to the prevailing working conditions, such as the nature of the starting material and that of the treating agent. Working temperatures of about 60 to 80° C. preferably temperatures of about 70° C. have in general proved to be very suitable. Temperatures below 60° C. are in general to be avoided for economic reasons, because at such temperatures the requisite period for completing the breaking down process will in many cases be too long. However, when employing suitable treating agents entirely satisfactory results may also be obtained at low temperatures as aforesaid, for example when allowing the starting material to stand in contact with ethyl acetate in combination with hydrochloric acid during several days. When employing temperatures higher than those indicated and also when the duration of the treatment is extended too long, there is a risk of the pectin being damaged.

The residues obtained in the hereinbefore described manner by treating the starting material with a liquid containing a solvent for the accompanying substances of the pectin as well as an acid, may be directly employed as gelatinising agents, after separating the liquid treating agents, for example by filtration. They are, however, preferably subjected to an after-treatment by extraction with a solvent for the accompanying substances for the purpose of effecting more extensive removal of the accompanying substances still contained therein. In general, the solvent also employed during the breaking down process, such as ethyl or methyl alcohol, but without the addition of acid, may be employed for this purpose. However, another solvent or solvent mixture may, of course, also be employed.

The application of the same solvent offers, for example, the advantage that the broken down residue may be subjected, without previous removal of the last traces of the breaking down agent to the after treatment with the solvent if desired in the same container.

This after treatment is with advantage carried out in a counter-current process, preferably in the warm. By employing extraction apparatus of known type, for example apparatus operating according to the Soxhlet principle, in which the extraction agent is kept boiling during the extraction process and the condensate produced from its vapours are circulated for the extraction of the material under treatment, the extraction may also be carried out with relatively very small quantities of solvent in the present case also.

By suitably selecting the extraction process, the after-treatment with the extraction agent can in certain circumstances, be carried out even without previous separation of the broken down residue from the breaking down liquid, by gradually displacing the breaking down liquid by the entering extraction agent.

Instead of the original pectin-containing vegetable starting materials, any desired pectin-containing intermediate products, obtained for example by known processes, may with advantage be treated according to this invention, with a view to recovering their pectin content i. e. both the water-insoluble and the water-soluble pectin contained therein, in a pure, water-soluble form.

The last traces of solvent still contained in the pectin-containing residue obtained in the above described manner from the treatment with the breaking down agent and in given cases the subsequent optional extraction with a solvent may be removed, for example by treatment with an air current, with a view to recovering the same.

In order to recover pure pectin from these residues, which as a rule contain the water-soluble pectin in considerable concentration, for example in an amount up to 40% and more (provided they are not employed directly as gelatinising agents), it is only necessary to extract them with water. This extraction is with particular advantage effected at relatively low or only slightly raised temperature, either with pure water or alternatively with any suitable aqueous solution, for example one which already contains additions, which are desired in the subsequent use of the pectin solution, such as citric acid. Thus, for example, fruit juices may be employed for the extraction of the pectin as well as solutions already obtained, for example by repeated extraction of the broken down residues and containing only relatively small amounts of pectin. In this way the pectin content of the aforesaid solutions may be systematically increased. The resulting, uncoloured or only slightly coloured, solution may be readily clarified by filtration, for example through kieselguhr. Any colouring present may be removed by treatment with suitable decolourising agents, such as charcoal, particularly active charcoal. The solutions so obtained are tasteless and so pure, that they can be employed directly for any practical purpose.

By carrying out the extraction in accordance with the known processes directed to the production of concentrated extracts, for example on the counter-current principle, extracts, which already contain a marketable concentration of pectin, for example 3 to 5%, may be obtained in one operation without the use of costly concentration operations.

The pectin may be recovered in solid form from these solutions by processes known per se, for example by evaporation in vacuo.

The process of this invention offers inter alia the following advantages over the hitherto known processes for the recovery of pectin from vegetable starting materials hereinbefore described:

The elimination of any damage to the pectin, such as is caused by the action of hot water or the hot aqueous acid on "boiling out" the pectin in the known processes. More extensive removal of the substances accompanying the pectin by the treatment of the starting materials with the organic solvent with simultaneous application of an acid, followed if desired by extraction with the solvent, than obtained for example with a single extraction with alcohol. Corresponding reduction in the space required for the apparatus for the recovery of the pure pectin by extracting the broken down residue with water. The elimination of the difficult, troublesome and costly operations for purifying the crude pectin first obtained, such as are necessary in the known processes, since, when operating according to this invention, the pectin is already present in the residue from the breaking down treatment in so pure a form, that this residue may be employed directly as gelatinising agent or that a very pure pectin solution may be obtained therefrom by simply dissolving out with water. The elimination of the difficulties attending the filtration of the extracts, obtained by the known processes by "boiling out" the pectin, owing to the slimy consistency of the residues. Reduction of the space required for the apparatus for the same reason, as well as the elimination of the costly vacuum evaporating plant, consisting of acid-resisting material, for evaporating the acid and extremely weak aqueous pectin solutions obtained by the known processes.

Since in the processes of this invention acid, aqueous pectin solutions, such as occur in the known processes and must for example be concentrated in vacuo, do not occur, the use of costly acid-resisting materials for evaporating such solutions may be dispensed with when operating according to this invention.

The process of this invention moreover offers the further advantage that it enables the portion of the pectin, already present in water-soluble form in the treated starting materials or intermediate products, also to be recovered. This portion of pectin in the known processes of pectin recovery is usually lost, since it is customary, before the actual boiling out of the pectin, to extract the starting material with water, in order to remove soluble impurities.

*Examples*

1. 1 kgm. of comminuted orange peel were maintained for one hour in contact with 4 litres of methyl alcohol and 200 ccs. of 38% hydrochloric acid at 70° C. The resulting solution was then separated from the residue by filtration and the latter extracted with methyl alcohol. The extraction residue, which may be employed directly as gelatinising agent, amounted to 55% of the starting material.

Pure pectin in a quantity amounting to 41.5% of the extraction residue or 22.8% of the starting material was recovered from the extraction residue by extraction with water.

2. 3 kgms. of residue from the production of lemon juice (i. e. bisected fruits from which the juice had been expressed (Pastazzo)), after washing in water experssing and comminuting were maintained whilst in a moist condition for three hours in contact with 12 litres of acetone and 100 ccs. of hydrochloric acid in boiling and thereafter further extracted with 95% alcohol. The residue weighed 426 gms. 144 gms. of pectin were recovered therefrom by extraction with water.

3. 1. kgm. of dried and ground apple residues were maintained for one hour in contact with 4 litres of 95% ethyl alcohol and 400 ccs. of glacial acetic acid at 78° C. and then further extracted with alcohol. 168 gms. of pectin were recovered from the residue by extraction with water.

4. 1 kgm. of dried orange pith (i. e. the inner white layer of the orange peel) were maintained for one hour in contact with 2.5 litres of 80% ethyl alcohol and 100 gms. of concentrated sulphuric acid at 65° C. and then further extracted with alcohol. The yield of pectin amounted to 50.5%.

5. 3 kgms. of dried and ground orange pith were allowed to stand for 4 days at ordinary temperature in contact with 10 litres of ethyl acetate acid and 500 ccs. of 38% hydrochloric acid. The liquid was then separated by filtration from the undissolved residue and the latter extracted with methyl alcohol. Yield 50% of pectin.

6. 3 kgms. of dried and ground orange pith were heated for half an hour to 80° C. with 6 litres of glacial acetic acid. The residue was then extracted with methyl alcohol. The same result was obtained as in Example 5.

7. 1 kg. of the fresh comminuted inner white layer of the orange peel whilst still in a moist condition were maintained for 3 hours at 62° C. in contact with 4 litres of 95% ethyl alcohol containing 5 gs. sulphuric acid per litre. The resulting solution was then separated from the residue and the latter extracted with alcohol. The pure pectin recovered from the extraction residue (which may be employed directly as gelatinising agent) by extraction with water amounted to 10, 15% of the starting material.

8. 1 kg. of "pastazzo" after washing in water, expressing, drying and grinding were maintained for one hour in contact with 2 litres of 70% ethyl alcohol containing 5 gs. sulphuric acid per litre at 65° C., and thereafter extracted with alcohol. From the residue were recovered 194 gs. of pectin by washing with water.

In all cases the limiting concentration of gelatinising ascertained according to the method of H. Ohler (Chem. Zeitung 57 (1933) 256 and Chem. Centralblatt 1933 I 3809) amounted to 0.1% up to at most 0.15%.

The following procedure was followed in the aforesaid gelatinising test:

15 ccs. of the pectin solution to be tested were mixed in a test tube with 5 ccs. of 95% alcohol containing 2% of citric acid, after which the mixture was placed for one hour in melting ice and after the expiry of this time a test was made to ascertain whether the mixture had gelatinised. By continuous dilution it was possible in this manner to ascertain in each case the minimum concentration of the pectin solution under examination, at which the contents of the test tube just gelatinised to such an extent that on rotating the test tube the contents neither ruptured nor flowed out.

The products made following this invention, such as the broken down residue and the pure pectin recovered therefrom, are distinctly to be distinguished from other products. The ratios of jellying power to the quantity of pectin is higher than that of the products hitherto found on the market.

A product such as the extracted broken down residue has not at all been known hitherto. This material is distinctly marked by the following qualities: it consists only of pectin, which is easily soluble even in cold water, and the insoluble constituents of the starting material, such as cellulose; the pectin content is specially high; the pectin solution recovered therefrom can easily be separated from the insoluble constituents and is very pure.

What I claim is:

1. A process for converting water-insoluble pectin into water-soluble pectin, which comprises treating a vegetable material containing water-insoluble pectin with a liquid consisting of an organic acid in which the substances accompanying the pectin are soluble but in which pectin itself is practically insoluble, and separating the resulting solution from the residue containing the water-soluble pectin.

2. A process for converting water-insoluble pectin into water-soluble pectin, which comprises treating a vegetable material containing water-insoluble pectin with a liquid consisting of glacial acetic acid, and separating the resulting solution from the residue containing the water-soluble pectin.

PAUL HIRSCH.